US012812661B2

(12) United States Patent
Wang et al.

(10) Patent No.: US 12,812,661 B2
(45) Date of Patent: Nov. 24, 2026

(54) ELECTRONIC DEVICE TETHERING WITH SUPPORTED NETWORK SLICING IN CELLULAR NETWORKS

(71) Applicant: GOOGLE LLC, Mountain View, CA (US)

(72) Inventors: Hui Wang, Buffalo Grove, IL (US); Liping Liu, Buffalo Grove, IL (US)

(73) Assignee: GOOGLE LLC, Mountain View, CA (US)

( * ) Notice: Subject to any disclaimer, the term of this patent is extended or adjusted under 35 U.S.C. 154(b) by 600 days.

(21) Appl. No.: 18/266,921

(22) PCT Filed: Dec. 14, 2020

(86) PCT No.: PCT/US2020/064899
§ 371 (c)(1),
(2) Date: Jun. 13, 2023

(87) PCT Pub. No.: WO2022/132127
PCT Pub. Date: Jun. 23, 2022

(65) Prior Publication Data
US 2024/0064776 A1 Feb. 22, 2024

(51) Int. Cl.
*H04W 72/25* (2023.01)
*H04W 48/18* (2009.01)
(Continued)

(52) U.S. Cl.
CPC ........... *H04W 72/25* (2023.01); *H04W 48/18* (2013.01); *H04W 76/14* (2018.02); *H04W 88/04* (2013.01)

(58) Field of Classification Search
CPC ..... H04W 48/18; H04W 72/25; H04W 76/14; H04W 84/02; H04W 88/04; H04W 4/48;
(Continued)

(56) References Cited

U.S. PATENT DOCUMENTS

2017/0295531 A1 10/2017 Singh et al.
2017/0332212 A1* 11/2017 Gage ........................ H04L 41/40
(Continued)

FOREIGN PATENT DOCUMENTS

CN 108713327 B 9/2021
WO WO-2017074486 A1 * 5/2017 ........... H04L 47/125
(Continued)

OTHER PUBLICATIONS

International Preliminary Report on Patentability mailed Jun. 29, 2023 for International Application No. PCT/JS2020/064899, 8 pages.
(Continued)

*Primary Examiner* — Thomas R Cairns

(57) ABSTRACT

A first user equipment (UE) is configured to establish a first tethered connection with a second UE 104 and a second tethered connection with at least a third UE. The first UE identifies a plurality of network slices provided by a network. The first UE selects at least a first network slice for the second UE and selects at least a second network slice for the at least third UE. The first UE wirelessly communicates data for the second UE over the at least first network slice using a first upstream link. The first UE wirelessly communicates data for the at least third UE over the at least second network slice using a second upstream link. The first upstream link and the second upstream link are concurrently maintained.

20 Claims, 7 Drawing Sheets

(51) Int. Cl.
*H04W 76/14* (2018.01)
*H04W 88/04* (2009.01)

(58) Field of Classification Search
CPC .. H04W 4/80; H04W 72/20; H04W 84/18–22
See application file for complete search history.

(56) References Cited

U.S. PATENT DOCUMENTS

| | | | | |
|---|---|---|---|---|
| 2018/0054237 | A1 | 2/2018 | Tseng et al. | |
| 2018/0352501 | A1* | 12/2018 | Zhang | H04W 48/14 |
| 2019/0026094 | A1 | 1/2019 | Stammers et al. | |
| 2019/0124561 | A1 | 4/2019 | Faccin et al. | |
| 2019/0268766 | A1 | 8/2019 | Luft et al. | |
| 2019/0357033 | A1* | 11/2019 | Cheng | H04W 16/02 |
| 2020/0059856 | A1 | 2/2020 | Cui | |
| 2023/0119027 | A1* | 4/2023 | Yang | H04L 12/1407 370/329 |
| 2023/0180169 | A1* | 6/2023 | Venkataraman | H04W 60/005 455/435.1 |
| 2023/0239700 | A1 | 7/2023 | Mouquet et al. | |
| 2024/0023007 | A1* | 1/2024 | Thiebaut | H04W 84/047 |
| 2025/0031278 | A1 | 1/2025 | Haustein et al. | |

FOREIGN PATENT DOCUMENTS

| | | | |
|---|---|---|---|
| WO | 2018211488 | A1 | 11/2018 |
| WO | 2019036494 | A1 | 2/2019 |
| WO | 2019221826 | A1 | 11/2019 |

OTHER PUBLICATIONS

International Search Report and Written Opinion mailed Jul. 29, 2021 for corresponding International Application No. PCT/US2020/064899, 15 pages.

Huawei et al., "CR on Slice Aware Access Control", 3GPP Draft; R2-1810145, vol. RAN WG2, [Jun. 19, 2018] <<URL:http://www.3gpp.org/ftp/Meetings%5F3GPP%5FSYNC/RAN2/Docs>>, Accessed Jul. 1, 2018, 9 pages.

5GPPP Architecture Working Group, "View on 5G Architecture," 5G Architecture White Paper, Version 2.0, Dec. 15, 2017, 140 pages.

Notification of The Second Office Action mailed Nov. 27, 2024 for Chinese Application No. 202080107915.6, 20 pages.

Translation of Chinese Office Action mailed May 16, 2024 for CN Application No. 202080107915.6, 33 pages.

Translation of Chinese Notice of Allowance mailed Mar. 6, 2025 for CN Application No. 202080107915.6, 8 pages.

European Notice of Allowance mailed Mar. 3, 2025 for EP Application No. 20838839.7, 47 pages.

* cited by examiner

226

| | 230 NETWORK SLICE ID | 228 SELECTION CRITERIA | ○ ○ ○ |
|---|---|---|---|
| 226-1 | NS_1 | DEFAULT | ○ ○ ○ |
| 226-2 | NS_2 | A, B, AND C | ○ ○ ○ |
| 226-3 | NS_3 | A, B, C, D, AND E<br>IF !A BUT X, Y, OR Z,<br>THEN B, D, F, AND G | ○ ○ ○ |
| | ○<br>○<br>○ | ○<br>○<br>○ | ○<br>○ ○ ○<br>○ |
| 226-4 | NS_N | A, D, D1, AND N | ○ ○ ○ |

FIG. 2

ELECTRONIC DEVICE TETHERING WITH SUPPORTED NETWORK SLICING IN CELLULAR NETWORKS

CROSS-REFERENCE TO RELATED APPLICATIONS

The present application is a U.S. National Stage under 35 U.S.C. § 371 of International Patent Application Serial No. PCT/US2020/064899, entitled "ELECTRONIC DEVICE TETHERING WITH SUPPORTED NETWORK SLICING IN CELLULAR NETWORKS" and filed on Dec. 14, 2020, the entirety of which is incorporated by reference herein.

BACKGROUND

Tethering is a technology that provides network communications for a first device (or devices) through a second device. For example, the first device and the second device may be configured with hardware and software that allows the first device to establish a wired or wireless network (tethered) connection with the second device. The first device transmits network requests to the second device through the tethered connection. The second device relays the network requests received from the first device to the appropriate network destination using communication channels established by the second device with a network, such as a cellular network. When the second device receives data associated with the first device, the second device forwards the data to the second device through the tethered connection. As such, tethering allows the first device to access the network's services using the first device's network connection.

SUMMARY OF EMBODIMENTS

In accordance with one aspect, a method, by a first user equipment (UE), includes establishing a first tethered connection with at least a second UE. A plurality of network slices provided by a network is identified. At least a first network slice is selected from the plurality of network slices for use by the at least second UE. Data for the at least second UE is wireless communicated over the at least first network slice using a first upstream link. In at least some embodiments, the first upstream link is one of a physical upstream link or a logical upstream link carried over a physical upstream link.

In at least some embodiments, a second network slice is selected from the plurality of network slices for use by the first UE, and data for the first UE is wirelessly communicated over the second network slice using a second upstream link. The first upstream link is concurrently with the second upstream link. In at least some embodiments, the second upstream link is one of a physical upstream link or a logical upstream link carried over a physical upstream link.

In at least some embodiments, selecting the at least first network slice includes obtaining a context associated with at least one of the at least second UE or the at least first network slice. The context is compared to selection criteria of one or more network slice selection policies. The at least first network slice is selected responsive to comparing the context to the selection criteria of the one or more network slice selection policies. In at least some embodiments, at least one of the one or more network selection policies is received from the at least second UE.

In at least some embodiments, selecting the at least first network slice further includes determining the context satisfies selection criteria of at least one network slice selection policy of the one or more network slice selection policies. The at least first network slice is selected responsive to the context satisfying the selection criteria of the at least one network slice selection policy. In at least some embodiments, the at least first network slice is separate and distinct from a second network slice used by the first UE, and the first upstream link is separate and distinct from a second upstream used by the first UE for wirelessly communicating data over the second network slice.

In at least some embodiments, selecting at least the first network slice further includes determining the context fails to satisfy the selection criteria of any of the one or more network slice selection policies, and selecting the at least first network slice responsive to the context satisfying of any of the one or more network slice selection policies. The at least first network slice is a default network slice used by the first UE, and the first upstream link is a default upstream link used by the first UE for wirelessly communicating data over the default network slice.

In at least some embodiments, the method further includes establishing a second tethered connection with a third UE. At least a second network slice is selected from the plurality of network slices for use by the third UE. Data for the third UE is wirelessly communicated over the at least second network slice using a second upstream link. In at least some embodiments, the at least second network slice is separate and distinct from the at least first network slice, and the first upstream link is maintained concurrently with the second upstream link.

In at least some embodiments, the method further includes selecting a second network slice from the plurality of network slices for use by the at least second UE, and wirelessly communicating data for the at least second UE over the second network slice using a second upstream link. In at least some embodiments, the second network slice is separate and distinct from the at least first network slice, and the first upstream link is maintained concurrently with the second upstream link.

In at least some embodiments, selecting the at least a first network slice includes transmitting information associated with the plurality of network slices. A selection of the at least first network slice is received from the at least second UE responsive to transmitting the information. The at least first network slice is selected responsive to receiving the selection from the at least second UE.

In at least some embodiments, the method further includes receiving a request from the at least second UE to release the at least first network slice, and releasing the at least first network slice responsive to receiving the request.

In at least some embodiments, the method further includes determining a context of the first tethered connection, and allocating one or more resources for the first tethered connection based on one or more policies and the context of the first tethered connection.

In accordance with another aspect, a non-transitory computer readable medium embodies a set of executable instructions. The set of executable instructions is to manipulate at least one of a processor and one or more radio frequency modems of a user equipment to perform the method of one or more embodiments described herein.

In accordance with yet another aspect, a first user equipment includes one or more radio frequency (RF) modems, a processor coupled to the one or more RF modems, and at least one memory storing executable instructions. The one or more RF modems are configured to wirelessly communicate with at least one network. The executable instructions are configured to manipulate at least one of the processor and the one or more RF modems to establish a first tethered connection with at least a second user equipment (UE), identify a plurality of network slices provided by a network, and select at least a first network slice from the plurality of network slices for use by the at least second UE.

In at least some embodiments, the at least one of the processor and the one or more RF modems are further manipulated to wirelessly communicate data for the at least second UE over the at least first network slice using a first upstream link.

In at least some embodiments, the at least one of the processor and the one or more RF modems are further manipulated to select a second network slice from the plurality of network slices for use by the first UE, and wirelessly communicate data for the first UE over the second network slice using a second upstream link.

In at least some embodiments, the at least one of the processor and the one or more RF modems are further manipulated to maintain the first upstream link concurrently with the second upstream link.

In at least some embodiments, at least one of the processor and the one or more RF modems are manipulated to select the at least first network slice by obtaining a context associated with at least one of the at least second UE or the at least first network slice, comparing the context to selection criteria of one or more network slice selection policies, and selecting the at least first network slice responsive to comparing the context to the selection criteria of the one or more network slice selection policies.

In at least some embodiments, the at least one of the processor and the one or more RF modems are manipulated to select the at least first network slice by determining the context satisfies selection criteria of at least one network slice selection policy of the one or more network slice selection policies and selecting the at least first network slice responsive to the context satisfying the selection criteria of the at least one network slice selection policy. In at least some embodiments, the at least first network slice is separate and distinct from a second network slice used by the first UE, and the first upstream link is separate and distinct from a second upstream used by the first UE for wirelessly communicating data over the second network slice.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIG. 2 is a diagram illustrating an example configuration of network slice selection policies implemented by a host UE in a tethered configuration in accordance with some embodiments.

DETAILED DESCRIPTION

Figure 1:
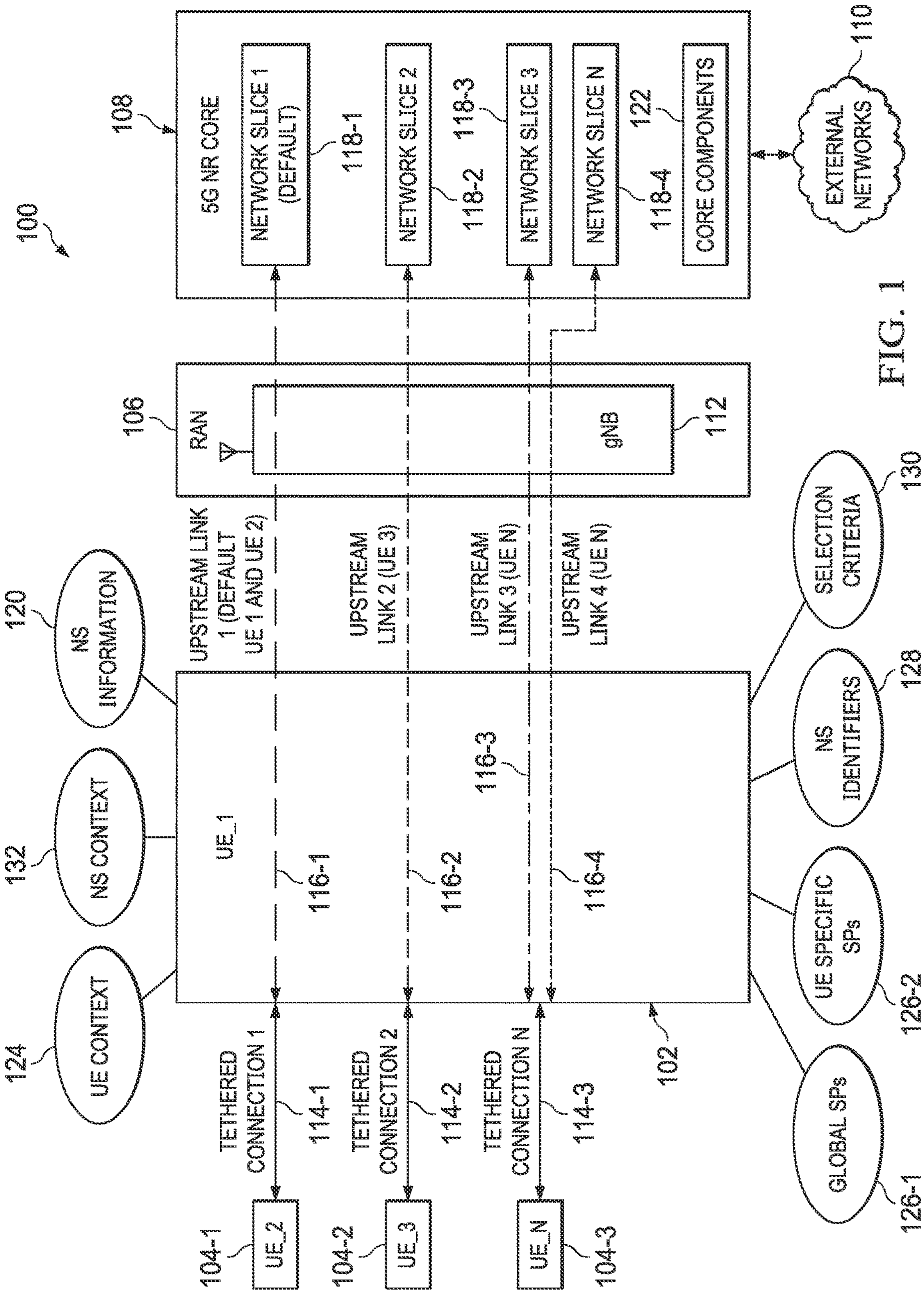
FIG. 1 is a diagram illustrating an example wireless communication system employing a host user equipment (UE) implementing network slicing for tethered client UE devices in accordance with some embodiments.

Tethering enables devices that may not have hardware or software resources for establishing a connection with a given network to still access the network through another capable device. For example, a first user equipment (UE) device, such as a tablet or notebook computer, may not have the hardware/software to connect with a cellular network. However, the first UE device can establish a wired or wireless tethered connection (downstream link) with a second UE device, such as a smartphone, capable of establishing a connection (upstream link) with the cellular network. The tethered connection enables the first UE device to access the cellular network's services through the second UE device's network connection.

As data and bandwidth allotments have increased for end-users, tethering has become a more viable and useful option for accessing the Internet through cellular networks. However, tethering technology typically is not configured to realize recent advancements in cellular networks. One such advancement is network slicing, which defines different classes of services and provides end-to-end logical networks (network slices) for these services that span multiple portions of a cellular network. Network slicing allows for network services to be customized based on the requirements of different use cases. The services provided by a Third Generation Partnership Project (3GPP) Fifth Generation New Radio (5G NR) cellular network can be implemented using a network slice, which is instantiated and managed by the network management system of the 5G NR cellular network. In at least some embodiments, a network slice defines a class of service in a cellular network and can be viewed as an end-to-end logical network that spans multiple portions of the cellular network. Each network slice provides service qualities tailored to the use case associated with the network slice, such as low latency, guaranteed bandwidth, support for long-battery-life Internet of Things (IoT) devices, and so on. Also, a network slice can have dedicated resources in the network of a single network operator or across the network of multiple network operators. An end-to-end network slice may be comprised of a Radio Access Network (RAN) slice and/or a core slice.

When a tethered connection is made between UE devices, only one upstream link is typically established with the cellular network. Also, conventional tethering technologies are typically not configured to maintain network slice mappings for data traffic over tethered connections. The combination of a single upstream link and lack of network slice mapping results in a single common network slice being used for the tethered connection regardless of the number of client UE devices that are tethered to the host UE device or the services being accessed by the client devices. As such, conventional tethering technology typically cannot utilize the different network slices offered by a cellular network.

The present disclosure describes embodiments of systems and methods for implementing multiple concurrent network slices for tethered connections. In at least some embodiments, a host UE device establishes a connection with a cellular network. As part of the connection process, the cellular network sends network slice information to the host UE device. This network slice information identifies the available network slices provided by the cellular network. In other embodiments, the network slice information is obtained by the host UE device while in an idle mode during a radio/cell search or at some other point in time before connecting to the cellular network. The network slice information comprises information such as a unique identifier, device and service requirements, capabilities, and the like for each available network. In at least some embodiments, the host UE device selects a default network slice from the available network slices for accessing the cellular network. The host UE device may select the default network slice, for example, based on the host UE device's context and/or the capabilities/requirements of the available network slices. For example, the host UE can select a default network slice based on one or more of the device type, executing applications, requested services or, latency requirements of the host UE device. In other embodiments, the cellular network selects a default network slice for the host UE device based on, for example, the context of the host UE device.

One or more client UE devices establish a tethered connection with the host UE device. The tethered connection may be a wired connection or a wireless connection. In at least some embodiments, the tethered connection is established before or after the host UE device has selected the default network slice. Responsive to the tethered connection (s) having been established, the host UE device determines one or more network slices to be used for each of the one or more client UE devices. For example, in at least some embodiments, the host UE device maintains and utilizes network slice selection policies (or rules) to select a network slice (or slices) for each client UE device. In at least some embodiments, the selection policies indicate which network slice is to be selected for a client UE device based on, for example, a context of the client UE device or a network slice request received from the client UE device. For example, a first selection policy may indicate that if a client UE device is an Internet-of-Things (IoT) device, then a first network slice is selected. In another example, a second selection policy may indicate that when a Wireless Fidelity (Wi-Fi) tethered connection is established between the host UE device and a client UE device, a second network slice is selected. Different selection policies can have different levels of granularity for selection criteria.

In at least some embodiments, a client UE device is assigned different network slices at different times. In other embodiments, a client UE device is assigned multiple different network slices concurrently. Also, different devices can be assigned different network slices based on the network slice selection policies. Once a network slice has been selected for each client UE device, the host UE device establishes an upstream link for the selected network slice if not already established. An upstream link, in at least some embodiments, includes a physical link or a virtual/logic link. For example, a physical upstream link, such as packet data network (PDN) connection, can support multiple network slices through network routes/rules, protocol data unit (PDU) assignment, and so on. As such, a single physical upstream link can support multiple logical upstream links for different network slices. Therefore, in at least some embodiments, a physical upstream link can be established for a selected network slice or a logical upstream link can be established for a selected network slice. Any data associated with a client UE device is transmitted and received through the assigned network slice instead of the default network slice. As such, the techniques described herein provide for a host UE device to establish multiple upstream links (physical and/or logical) for implementing concurrent network slices for tethered client UE devices in a cellular network. Data or data associated with tethered client UE devices can benefit from the networking, computing, and storage resources allocated and configured for the network slices carrying the data.

For ease of illustration, the following techniques are described in an example context in which one or more UE devices and Radio Access Networks (RANs) implement one or more radio access technologies (RATs) including at least a Fifth Generation (5G) New Radio (NR) standard (e.g., Third Generation Partnership Project (3GPP) Release 15, 3GPP Release 16, etc.) (hereinafter, "5G NR" or "5G NR standard"). However, it should be understood that the present disclosure is not limited to networks employing a 5G NR RAT configuration, but rather the techniques described herein can be applied to any combination of different RATs employed at the UE devices and the RANs. It should also be understood that the present disclosure is not limited to any specific network configurations or architectures described herein for implementing network slicing (or equivalent technology) with tethered connections, but instead, techniques described herein can be applied to any configuration of RANs where a host UE device can establish multiple concurrent upstream links to implement different network slices for tethered client UE devices. Also, the present disclosure is not limited to the examples and context described herein, but rather the techniques described herein can be applied to any network environment where a host UE device implements network slicing for tethered client UE devices.

FIG. 1 illustrates an example mobile cellular network 100 employing a set of tethered UE devices 102, 104 implementing network slicing in accordance with some embodiments. It should be understood that the present disclosure is not limited to a cellular network 100, and the techniques described herein apply to other types of wireless communication systems. As shown, the cellular network 100 includes multiple UE devices 102, 104, one or more RANs 106, and a core network 108. FIG. 1 further shows that one or more external networks 110, such as the Internet or a public switched telephone network (PSTN), are coupled to the cellular network 100 via the core network 108. It should be understood that the cellular network 100 may include additional components not shown in FIG. 1.

The UE devices 102, 104 can include any of a variety of electronic devices capable of wired and/or wireless communications, such as a smartphone, a tablet computer, a notebook computer, a desktop computer, a smartwatch or other wearable computing device, an automobile or other vehicle employing wireless communication services (e.g., for navigation, provision of entertainment services, in-vehicle mobile hotspots, etc.), a gaming device, a media device, an IoT device (e.g., sensor node, controller/actuator node, or a combination thereof), and another device capable of wired and/or wireless communication. In at least one embodiment, the RAN(s) 106 is accessible using, for example, a 5G NR RAT and is connected to one or more other RANs (not shown) via at least the core network 108. A RAN 106 implementing a 5G NR RAT may be referred to as a 5G NR RAN or an NR RAN. One example of a core network 108 in a 5G NR cellular network is Fifth-Generation Core (5GC) network.

Each RAN 106 includes one or more base stations 112 operable to wirelessly communicate with UE devices 102, 104 within signal range, with each or a combination of base stations 112 defining a single "cell" of coverage for the RAN 106. In at least some embodiments, a base station 112 is implemented in a macrocell, microcell, small cell, picocell, or the like, or any combination thereof. Consistent with the terminology employed by the 5G NR standard, a base station 112 implementing a 5G NR RAT is referred to herein as "5G NodeB 112" or "gNB 112". As is well known in the art, the base stations 112 operate as an "air interface" to establish radio frequency (RF) wireless communication links with UE devices 102, 104, which can be implemented as any suitable type of wireless communication link. These wireless communication links then serve as data and voice paths between the UE devices 102, 104 and the core network 108, which is coupled to one or more of the external networks 110, for providing various services to the UE devices 102, 104. Examples of these services include voice services via circuit-switched networks or packet-switched networks, messaging services such as simple messaging service (SMS) or multimedia messaging service (MMS), multimedia content delivery, presence services, and so on. In at least some embodiments, multiple wireless communication links are aggregated in a carrier aggregation to provide a higher data rate for the UE devices 102, 104. Multiple wireless communication links from multiple base stations 112 can be configured for Coordinated Multipoint (CoMP) communication with the UE devices 102, 104. Additionally, in at least some embodiments, multiple wireless communication links are configured for single-RAT) or multi-RAT dual connectivity (MR-DC).

FIG. 1 further illustrates an example configuration of the cellular network 100 that implements network slicing for tethered connections between UE devices 102, 104. In at least some embodiments, one or more client UE devices 104 (illustrated as 104-1 to 104-3) establish a tethered connection 114 (illustrated as 114-1 to 114-3) with a host UE device 102. The tethered connection 114 (also referred to as a downstream link 114) can be established using wired or wireless technologies. For example, a wired connection between the host UE device 102 and a client UE device 104 can be made using a Universal Serial Bus (USB) connection, an Ethernet connection, and so on. A wireless connection can be made using, for example, Wi-Fi (that is, one or more of the IEEE 802.11 wireless standards), Bluetooth®, Zigbee®, Near-field Communication (NFC), and so on.

The tethered connections 114 enable client UE devices 104 to access the core network 108 and the external networks 110 through a communication link(s) 116 (also referred to as an upstream link(s) 116) established between the host UE device 102 and the core network 108 through the RAN 106. For example, the client UE devices 104 transmit network requests to the host UE device 102 over their respective tethered connection 114. The host UE device 102 relays the network requests received from the client UE devices 104 to the appropriate destination through the RAN 106 and core network 108 using the upstream link 116 established by the host UE device 102. The host UE device 102 also receives data associated with one or more of the client UE devices 104 through the upstream link 116 from, for example, an external network 110. The host UE device 102 transmits the received data to the appropriate client UE device 104 through the tethered connection 114. Data, in at least some embodiments, includes singular data packets, multiple data packets, data streams, data bursts, and so on.

In conventional tethered configurations, a host UE device is typically not configured to maintain network slice mappings for data traffic over tethered connections. As such, the host UE usually establishes a single common upstream link with the 5G NR core network 108 for all connected client UE devices. Therefore, only the default network slice currently used by the host UE device can be used for the client UE devices. However, as described in greater detail below, the host UE device 102 can, in some embodiments, establish multiple concurrent upstream links 116 (illustrated as 116-1 to 116-4) and access multiple network slices 118 for tethered client UE devices 104 using the upstream links 116. In at least some embodiments, one or more of the upstream links 116 are a physical upstream link. In other embodiments, one or more of the concurrent upstream links 116 are logical upstream links carried over a physical upstream link.

In at least some embodiments, the host UE device 102 obtains network slice information 120 associated with the network slices 118 of the core network 108. FIG. 1 shows that the core network 108 includes multiple network slices 118 (illustrated as network slice 118-1 to 118-4). Throughout this description, network slice 118-1 is referred to as the default network slice, and network slices 118-2 to 118-4 are referred to as the non-default network slices. Examples of network slices 118 include network slices configured for 5G NR enhanced Mobile Broadband (eMBB), 5G Ultra-Reliable Low Latency Communications (URLLC), 5G NR massive Machine Type Communications (mMTC), massive Internet-of-Things (MIoT), and so on. The cellular network 100 may include any number and combination of network slices 118, including those not illustrated in FIG. 1.

The network slice information 120, in at least some embodiments, comprises a list or other data structure representing available network slices 118 and information such as an identifier, device requirements and application/service requirements, capabilities, service level agreements (SLAs), configured resources, and the like for each available network slice 118. In at least some embodiments, the network slice information 120 is obtained by the host UE device 102 from a user, a network operator, a base station 112, one or more core network components 122, an external network 110, and so on. In one example, the network slice information 120 is obtained by the host UE device 102 as part of the attachment process with the cellular network 100. In another example, the network slice information 120 is obtained by the host UE device 102 while in an idle mode during a radio/cell search or at some other point in time before attaching to the cellular network 100.

The host UE device 102, in at least some embodiments, selects the default network slice 118-1 based on, for example, a context 124 (also referred to as context information 124) of the host UE device 102 and/or one or more selection policies (SPs) 126 described below. In other embodiments, the RAN 106 or a component 122 of the core network 108 managing the network slices 118 selects a default network slice 118-1 for the host UE device 102. For example, the host UE device 102 can transmit a network slice access request to one or more network components 122, such as a network slice management component, along with a context 124 of the host UE device 102. The network slice management component uses the context 124 of the host UE device 102 to select a default network slice 118-1 for the host UE device 102.

In at least some embodiments, a context 124 of a UE device indicates various parameters/attributes of the UE device. Examples of context information include tethered connection parameters such as link type (e.g., wired or wireless, USB, Wi-Fi, Bluetooth®, etc.), link frequency, channel, and so on; client UE device type (e.g., smartphone, tablet computing device, laptop, vehicle, IoT device, gaming device, etc.); media access control (MAC) address of the UE device 102, 104; source Internet Protocol (IP) address of the data associated with the UE device 102, 104; the destination IP address of the data associated with the UE device 102, 104; the communication port associated with the data of the UE device 102, 104; the applications and/or services on the UE device 102, 104 requesting data; latency requirements of the UE device 102, 104; the mobility status (e.g., in a vehicle, stationary, on a pedestrian, traveling above or below a speed threshold, etc.) of the UE device 102, 104; the type and/or size of data being transmitted and/or requested by the UE device 102, 104; and so on.

The host UE device 102, in at least some embodiments, activates the selected default network slice 118-1 by sending an access request to the RAN 106 and/or one or more core network components 122 for accessing the selected default network slice 118-1. After the host UE device 102 has been authenticated and granted access to the default network slice 118-1, the host UE device 102 uses a default upstream link 116-1 to access the default network slice 118-1 and related services.

Data associated with the default network slice 118-1 are wirelessly communicated (e.g., transmitted and/or received) by the host UE device 102 over the default upstream link 116-1. Wireless communication of data, in at least some embodiments, can include one or both of transmitting data or receiving data. The host UE device 102 may establish the upstream link 116-1 with the cellular network 100 before or after selecting the default network slice 118-1. Various mechanisms and techniques may be implemented by the host UE device 102 for establishing an upstream link 116 and accessing a network slice 118, such as those described in the 3rd Generation Partnership Project; Technical Specification Group Services and System Aspects; System Architecture for the 5G System; Stage 2 (Release 15).

In addition to selecting and accessing the default network slice 118-1, the host UE device 102 also selects and accesses one or more network slices 118 for the client UE devices 104. In at least some embodiments, the host UE device 102 uses a set of one or more network slice selection policies 126 (such as the illustrated network slice selection policies 126-1 and 126-2) for determining which of the network slices 118 to select and use for a given client UE device 104. The host UE device 102, in at least some embodiments, obtains the network slice selection policies 126 (hereinafter, "selection policies 126" for purposes of brevity) from a user, a network operator, one or more of the client UE devices 104, a base station 112, a component 122 of the core network 108, an external network 110, and so one. In one example, a client UE device 104 transmits one or more selection policies 126 to the host UE device 102 using the tethered connection 114. In at least some embodiments, the selection policies 126 include, for example, identifiers 128 of the network slices 118 and criteria 130 for each network slice 118 that govern the selection and utilization of the network slices 118 for the client UE devices 104. The host UE device 102 may store and access the selection policies 126 locally and/or remotely.

In at least some embodiments, the selection policies 126 are global selection policies 126-1 applied to one or more client UE devices 104. In other embodiments, one or more selection policies 126 are UE specific selection policies 126-2 defined or configured for a specific client UE device 104. If a client UE device 104 is associated with a UE specific selection policy 126-2, the host UE device 102 may use the UE specific selection policy 126-2 to select a network slice 118 for the client UE device 104 instead of a global selection policy 126-1. In at least some embodiments, the selection criteria 130 of a selection policy 126 can be defined from the viewpoint of a UE device 102, 104 and/or network slice 118. For example, a global selection policy 126-1 may indicate that an associated network slice 118 may only be selected for a client UE device 104 if the context 124 of the client UE device 104 satisfies the selection criteria 130. In another example, a UE specific selection policy 126-2 may include selection criteria 130 that indicates a specific slice context 132 (e.g., parameters, attributes, capabilities, etc.) for a network slice 118 to be selected for a given client UE device 104. In at least some embodiments, the host UE device 102 may use a selection policy 126 to select a default network slice 118-1. Also, in at least some embodiments, a user or application executing on either the host UE device 102 or client UE device 104 can update a selection policy 126 defined for the client UE device 104.

In addition to selection criteria 130, the selection policies 116, in at least some embodiments, also include resource allocation information for the tethered connections 114. For example, the selection policies 126 can indicate specific resources for allocation to any client UE 104 or one or more specific client UE devices 104 for a given tethering context. For example, a selection policy 126 can indicate that, for a tethering context in which one or more client UE devices 104 are connected to the host UE 102 using a Wi-Fi link, resources such as a specific channel, frequency, buffer size, and so on are to be allocated to the one or more client UE devices 104. In at least some embodiments, the resource allocation information may be included in a separate and distinct policy from the selection policies 126.

FIG. 2 shows a generalized example of network slice selection policies 226 (illustrated as 226-1 to 226-4), which are embodiments of the selection policies 126 of FIG. 1. In at least some embodiments, each network slice selection policy 226 (or simply "selection policy 226" herein for brevity's sake) comprises an identifier 230 and selection criteria 228. The identifier 230 uniquely identifies the network slice 118 associated with the selection policy 226. The selection criteria 228 are used by the host UE device 102 to determine whether the associated network slice 118 is selected and used for a client UE device 104. For example, a first selection policy 226-1 associated with a first network slice 118-1 includes the unique identifier "NS_1", and the selection criteria 228 comprises a value of "Default". In this example, a "Default" value indicates the first network slice 118-1 is designated as a default network slice 118 selected for a client UE device 104 when no other network slice 118 can be selected for the client UE device 104. For example, if the current context 124 of the client UE device 104 does not satisfy the selection criteria 228 defined for non-default network slices 118-2 to 118-4, the host UE device 102 selects the default network slice 118-1 for the client UE device 104. Alternatively, the host UE device 102 may determine the context 124 of the client UE device 104 satisfies the selection criteria 228 of the default network slice 118-1 and selects the default network slice 118-1 based on this determination. In embodiments, where the selection criteria 228 are to be satisfied by the network slices 118, as compared to the client UE devices 104, the host UE device 102 selects the default network slice 118-1 when the remaining network slices 118-2 to 118-4 do not satisfy the selection criteria 228

A second selection policy 226-2 associated with a second network slice 118-2 includes the unique identifier "NS_2" and the selection criteria "A, B, and C". In this example, the host UE device 102-2 selects and utilizes the second network slice 118-2 when conditions A, B, and C are satisfied. Depending on how the second selection policy 226-2 is configured, the conditions are to be satisfied either by a client UE device 104 or the second network slice 118-2.

A third selection policy 200-3 associated with a third network slice 118-3 includes the unique identifier "NS_3", a first set of selection criteria “A, B, C, D, and E”, and a second set of selection criteria “If !A but X, Y, or Z, then B, D, F, and G”. In this example, the third selection policy 226-3 of the third network slice 118-3 includes a more complex set of selection criteria 206 than the second selection policy 226-2 of the second network slice 118-2. For example, the host UE device 102 selects the third network slice 118-3 for the client UE device 104 if conditions A, B, C, D, and E are satisfied by the client UE device 104. The third selection policy 226-3 also provides an additional rule that states, if condition A is not satisfied but conditions X, Y, or Z are satisfied, then the third network slice 118-3 can be selected if conditions B, D, F, and G are also satisfied. For example, condition A may indicate that the device type of the client UE device 104 should be a tablet computing device. Conditions B, C, D, and E may be specific conditions based on the client UE device 104 being a tablet computing device. However, in this example, the third network slice 118-3 is not limited to tablet computing devices. Therefore, the second set of selection criteria includes conditions indicating that if the client UE device 104 is not a tablet computing device (condition A) but is either a gaming device, smartphone, or wearable computing device (conditions X, Y, or Z), the third network slice 118-3 can be selected for the client UE device 104 if the additional conditions B, D, G, and G are satisfied.

A fourth selection policy 226-4 associated with a fourth network slice 118-4 includes the unique identifier “NS_N” and the selection criteria “A, D, D1, and N”. In this example, the host UE device 102-2 selects and utilizes the fourth network slice 118-4 when conditions A, A1, D, and N are satisfied. In this example, not only does condition D have to be satisfied but so does a sub-condition D1 of condition D. For example, condition D may indicate that a tethered connection type between the host UE device 102 and the client UE device 104-1 to 104-3 should be a Wi-Fi-based link and sub-condition D1 may indicate that the Wi-Fi-based link should be utilizing the 5 gigahertz (GHz) frequency. It should be noted that embodiments are not limited to selection criteria 228 having to be satisfied by client UE devices 104. For example, the selection criteria 228 may indicate specific parameters or attributes (e.g., latency, bandwidth, services, SLAs, etc.) of a network slice 118 to be selected for a given client UE device 104.

Selection criteria 228 can be similar to the UE device context parameters listed above. For example, selection criteria 228 can include tethered connection parameters such as link type (e.g., wired or wireless, USB, Wi-Fi, Bluetooth®, etc.), link frequency, channel, and so on; client UE device type; media access control (MAC) address; source Internet Protocol (IP) address of the data associated with the client UE device 104; the destination IP address of the data associated with the client UE device 104; the communication port associated with the data of the client UE device 104; the applications and/or services on the client UE device 104 requesting data; the mobility status (e.g., in a vehicle, stationary, on a pedestrian, traveling above or below a speed threshold, etc.) of the client UE device 104; a combination thereof; and so on.

Referring back to FIG. 1, in at least some embodiments, a network slice selection policy 126 may include additional information regarding the management of the selection policy 126. For example, a selection policy 126 can indicate that a client UE device 104 is or is not authorized to update the selection rules or criteria of the selection policy 126; the client UE device 104 needs or does not need to be authorized to update the selection rules or criteria; the client UE device 104-1 is or is not allowed to request its current network slice 118 or request a new network slice 118; the client UE device 104-1 needs or does not need to be authorized to request/release a network slice 118; a user of the host UE device 102 or the client UE device 104-1 can or cannot be shown details of the selection policy 126 or just a summary overview; and so on. In other embodiments, the additional information may be maintained or accessed separately from the selection policies 126.

In at least some embodiments, the host UE device 102 determines one or more network slices 118 for a client UE device 104 responsive to the client UE device 104 establishing a tethered connection (downstream link) 114 with the host UE device 102, or upon receiving a request from the client UE device 104 to access the cellular network 100. As part of, or before, the network slice 118 selection process, the host UE device 102 obtains a current context 124 of the client UE device 104 for which a network slice 118 is to be selected. For example, the host UE device 102 can analyze the selection policies 126 and identify the type of context information 124 for determining which of the network slices 118 can be selected for a client UE device 104. For example, after analyzing a selection policy 126 for the third network slice 118-3, the host UE device 102 determines that context information 124 such as device type, tethered connection type, tethered connection frequency, and data type are needed to determine if the third network slice 118-3 can be selected for the client UE device 104. The host UE device 102 then communicates with the client UE device 104 to obtain this context information 124. However, in at least some embodiments, this and other context information 124 is already provided to the host UE device 102 as part of establishing the tethered connection 114. As such, the context 124 of the client UE device 104 can be automatically provided to host UE device 102 by the client UE device 104, and/or the host UE device 102 can query the client UE device 104 for context information 124.

The host UE device 102, in at least some embodiments, compares the context 124 of a client UE device 104 to the selection criteria 130 of the selection policies 126 to determine if the context 124 satisfies the selection criteria 130 of one or more network slices 118. If the context 124 of the client UE device 104 satisfies the selection criteria 130 of a network slice 118, the host UE device 102 selects the network slice 118 and establishes an upstream link 116 with the cellular network 100 for the client UE device 104 to wirelessly communicate data through the selected the network slice 118. In other embodiments, the upstream link 116 may be established before selecting the network slice 118. In at least some embodiments, if the context 124 of the client UE device 104 satisfies the selection criteria 130 of two or more network slices 118, the host UE device 102 selects the two or more network slices 118 for the client UE device 104. The host UE device 102 establishes a separate upstream link 116 for each of the two or more network slices 118 to wirelessly communicate data through the selected network slices 118. If the context 124 of the client UE device 104 does not satisfy the selection criteria 130 of the non-default network slices 118-2 to 118-4, the host UE device 102, in at least some embodiments, selects the default network slice 118-1 for the client UE device 104. In this embodiment, data associated with the client UE device 104 are wirelessly communicated through the default network slice 118-1 using the default upstream link 116-1.

In at least some embodiments, instead of (or in addition to) analyzing a context 124 of a client UE device 104 with respect to the selection policies 126, the host UE device 102 analyzes a context 132 (also referred to as context information 132) of the network slices 118 with respect to the selection policies 126. For example, a selection policy 126 may include selection criteria 130 based on a context 132 of network slices 118. For example, selection criteria 130 can indicate specific attributes and/or parameters, such as latency, bandwidth, offered services, SLAs, etc., for a network slice 118 to be selected for a given client UE device 104.

Also, in at least some embodiments, a client UE device 104 requests one or more specific network slices 118 or types of network slices 118 by sending a request to the host UE device 102 using the tethered connection 114. For example, the host UE device 102 can broadcast/send a list of available network slices 118 provided by the cellular network to one or more of the client UE devices 104 through the tethered connection 114, a network or application layer protocol, and so on. A user, application, or service of the client UE device 104 can select one or more of the available network slices 118. The client UE device 104 then sends a request to the host UE device 102 identifying the requested network slice(s) 118. The host UE device 102 proceeds to select the requested network slice(s) 118 for the client UE device 104. In at least some embodiments, the host UE device 102 implements one or more selection policies 126 to determine if the requested network slice(s) 118 can be used for the client UE device 104.

The network slice 118 selection techniques described above are performed for each client UE device 104, resulting in multiple concurrent upstream links 116 being established for one or more client UE devices 104. The concurrent upstream links 116 enable multiple different network slices 118 to be used for the UE devices 104. For example, FIG. 1 shows that the host UE device 102 has established multiple concurrent upstream links 116-1 to 116-4. In this example, the first (default) upstream link 116-1 is a default upstream link for use with the first (default) network slice 118-1. The host UE device 102 utilizes the default upstream link 116-1 and the default network slice 118-1 to wirelessly communicate its data. FIG. 1 also shows that the host UE device 102 selected the default network slice 118-1 for the first client UE device 104-1. Therefore, data associated with the first client UE device 104-1 are also wirelessly communicated over the default network slice 118-1 using the default upstream link 116-1. The host UE device 102 has selected the second network slice 118-2 and established a second upstream link 116-2 for the second client UE device 104-2. Therefore, data associated with the second client UE device 104-2 are wirelessly communicated over the second network slice 118-2 using the second upstream link 116-2.

The third network slice 118-3 and the fourth network slice 118-4 have been selected by the host UE device 102 for the third client UE device 104-3. In this example, a separate upstream link 116-3 and 116-4 has been established for each of the third network slice 118-3 and the fourth network slice 118-4. Therefore, some data associated with the third client UE device 104-3 are wirelessly communicated over the third network slice 118-3 using the third upstream link 116-3, while other data associated with the third client UE device 104-3 are wirelessly communicated over the fourth network slice 118-4 using the fourth upstream link 116-4. For example, different applications or services, such as live gaming and background downloading, on the third client UE device 104-3 may benefit from using different network slices 118-3, 118-4 at the same time. Data associated with the gaming application/service can be wirelessly communicated over the third network slice 118-3 using the third upstream link 116-3, while data associated with application/service downloading files in the background can be wirelessly communicated over the fourth network slice 118-4 using the fourth upstream link 116-4.

The host UE device 102, in at least some embodiments, establishes a separate upstream link 116 for each network slice 118 selected for the client UE devices 104.

In other embodiments, if the host UE device 102 selects the same network slice 118 for multiple client UE devices 104, a common upstream link 116 is established for at least two of the multiple client UE devices 104 for wirelessly communicating data. In this embodiment, the common upstream link 116 is shared between the at least two client UE devices 104 for wireless communicating data over the common network slice 118.

In at least some embodiments, the host UE device 102 may change the network slices 118 selected for a client UE device 104 based on a change in context 124 of the client UE device 104. For example, a network slice 118 may be initially selected for client UE device 104-3 based on the context 124 indicating a game is currently being played on the client UE device 104-3. However, after the user has finished playing the game, the host UE device 102 may request a high definition video stream. Therefore, the host UE device 102 releases the initial network slice 118 and initial upstream link 116, which were servicing the gaming application, and selects a new network slice 118 and establishes a new upstream link 116 to service the high definition video stream. In at least some embodiments, if an upstream link 116 associated with newly selected network slice 118 has already been established for another client UE device 104-2, the host UE device 102 may utilize this upstream link 116 for the client UE device 104-3.

A client UE device 104, in at least some embodiments, can request to release its current network slice(s) 118 and/or activate a new network slice(s) 118. For example, the second client UE device 104-2 can send a request to the host UE device 102 using the tethered connection 114-2 to release the second network slice 118-2 activated for the second client UE device 104-2. The host UE device 102 then proceeds to deactivate the second network slice 118-2 and, in at least some embodiments, the associated upstream link 116-2. If the second client UE device 104-2 has requested a new network slice 118, the host UE device 102 activates the new network slice 118 for the second client UE device 104-2 according to the network slice selection techniques described above and establishes a new upstream link 116 if needed.

Figure 3:
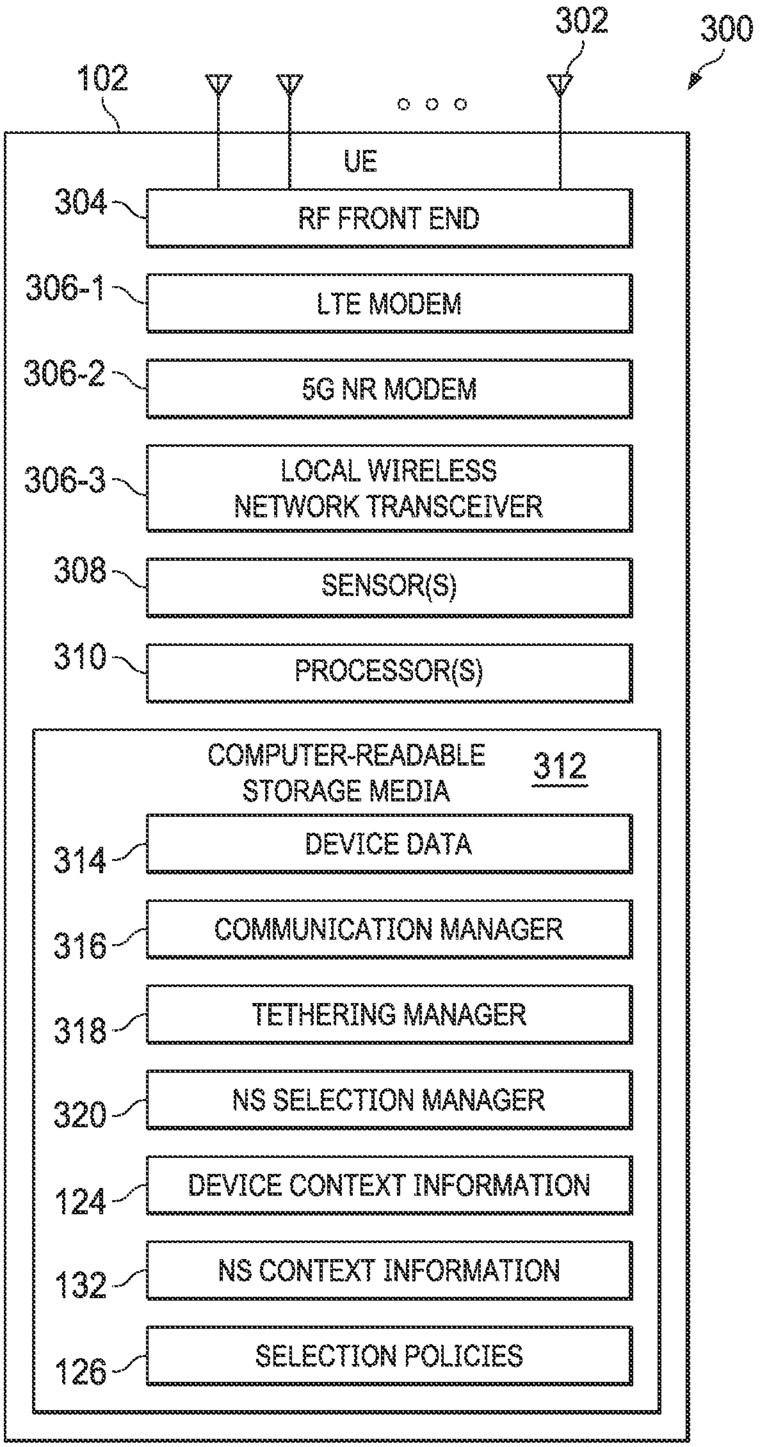
FIG. 3 is a diagram illustrating an example configuration of a UE implementing network slicing for tethered client UE devices in accordance with some embodiments.

FIG. 3 illustrates an example device diagram 300 of a UE device 102 (or 104). In aspects, the device diagram 300 describes a UE device that can implement various aspects of network slicing for tethered client UE devices. The UE device 102 may include additional functions and interfaces that are omitted from FIG. 3 for the sake of clarity. The UE device 102, in at least some embodiments, includes antennas 302, a radio frequency (RF) front end 304, and one or more RF transceivers 306 (e.g., a 3GPP Fourth Generation (4G) Long Term Evolution (LTE) transceiver 306-1 and a 5G NR transceiver 306-2) for communicating with a base station 112 in a RAN 106, such as a 5G RAN and/or an E-UTRAN. The UE device 102, in at least some embodiments, also includes one or more additional transceivers 306-3, such as a local wireless network transceiver, for communicating over one or more local wireless networks (e.g., WLAN, Bluetooth, Near-Field Communication (NFC), a personal area network (PAN), Wireless Fidelity Direct (Wi-Fi-Direct), IEEE 802.15.4, ZigBee, Thread, mmWave, and the like) with other UE devices 104, such as those in a tethered configuration with the UE device 102. The RF front end 304, in at least some embodiments, couples or connects the LTE transceiver 306-1, the 5G NR transceiver 306-2, and the local wireless network transceiver 306-3 to the antennas 302 to facilitate various types of wireless communication.

In at least some embodiments, the antennas 302 of the UE device 102 include an array of multiple antennas configured similar to or different from each other. The antennas 302 and the RF front end 304, in at least some embodiments, are tuned to, and/or can be tunable to, one or more frequency bands, such as those defined by the 3GPP LTE, 3GPP 5G NR, IEEE WLAN, IEEE WMAN, or other communication standards. In at least some embodiments, the antennas 302, the RF front end 304, the LTE transceiver 306-1, the 5G NR transceiver 306-2, and/or the local wireless network transceiver 306-3 are configured to support beamforming (e.g., analog, digital, or hybrid), or in-phase and quadrature (I/Q) operations (e.g., I/Q modulation or demodulation operations) for the transmission and reception of communications with the base station 112. By way of example, the antennas 302 and the RF front end 304 operate in sub-gigahertz bands, sub-6 GHz bands, and/or above 6 GHz bands defined by the 3GPP LTE, 3GPP 5G NR, or other communication standards.

In at least some embodiments, the antennas 302 include one or more receiving antennas positioned in a one-dimensional shape (e.g., a line) or a two-dimensional shape (e.g., a triangle, a rectangle, or an L-shape) for implementations that include three or more receiving antenna elements. While the one-dimensional shape enables the measurement of one angular dimension (e.g., an azimuth or an elevation), the two-dimensional shape enables two angular dimensions to be measured (e.g., both azimuth and elevation). Using at least a portion of the antennas 302, the UE device 102 can form beams that are steered or un-steered, wide or narrow, or shaped (e.g., as a hemisphere, cube, fan, cone, or cylinder). The one or more transmitting antennas may have an un-steered omnidirectional radiation pattern or may be able to produce a wide steerable beam. Either of these techniques enables the UE device 102 to transmit a radar signal to illuminate a large volume of space. In some embodiments, the receiving antennas generate thousands of narrow steered beams (e.g., 2000 beams, 4000 beams, or 6000 beams) with digital beamforming to achieve desired levels of angular accuracy and angular resolution.

The UE device 102, in at least some embodiments, includes one or more sensors 308 implemented to detect various properties such as temperature, supplied power, power usage, battery state, or the like. The sensors 308 can include any one or a combination of temperature sensors, thermistors, battery sensors, and power usage sensors.

The UE device 102 also includes at least one processor 310 and a non-transitory computer-readable storage media 312 (CRM 312). The processor 310, in at least some embodiments, is a single-core processor or a multiple-core processor composed of a variety of materials, such as silicon, polysilicon, high-K dielectric, copper, and so on. The computer-readable storage media described herein excludes propagating signals. The CRM 312, in at least some embodiments, includes any suitable memory or storage device such as random-access memory (RAM), static RAM (SRAM), dynamic RAM (DRAM), non-volatile RAM (NVRAM), read-only memory (ROM), or Flash memory useable to store device data 314 of the UE device 102. The device data 314 includes, for example, user data, multimedia data, beamforming codebooks, applications, and/or an operating system of the UE device 102, which are executable by the processor 310 to enable user-plane communication, control-plane signaling, and user interaction with the UE device 102.

The CRM 312, in at least some embodiments, also includes a communication manager 316. Alternatively, or additionally, the communication manager 316, in at least some embodiments, is implemented in whole or part as hardware logic or circuitry integrated with or separate from other components of the UE device 102. In at least some embodiments, the communication manager 316 configures the RF front end 304, the LTE transceiver 306-1, the 5G NR transceiver 306-2, and/or the local wireless network transceiver 306-3 to perform one or more wireless communication operations.

In at least some embodiments, the CRM 312 further includes a tethering manager 318, a network slice (NS) selection manager 320, device context information 124, network slice context information 132, selection policies 126, and so on. Alternately, or additionally, one or more of these components, in at least some embodiments, are implemented in whole or part as hardware logic or circuitry integrated with or separate from other components of the UE device 102. The tethering manager 318 and network slice selection manager 320, in at least some embodiments, configures the RF front end 304, the transceiver(s) 306, processor 310, and/or other components of the UE device 102 to implement the techniques described herein for utilizing network slicing with tethered client UE devices 104.

Figure 4:
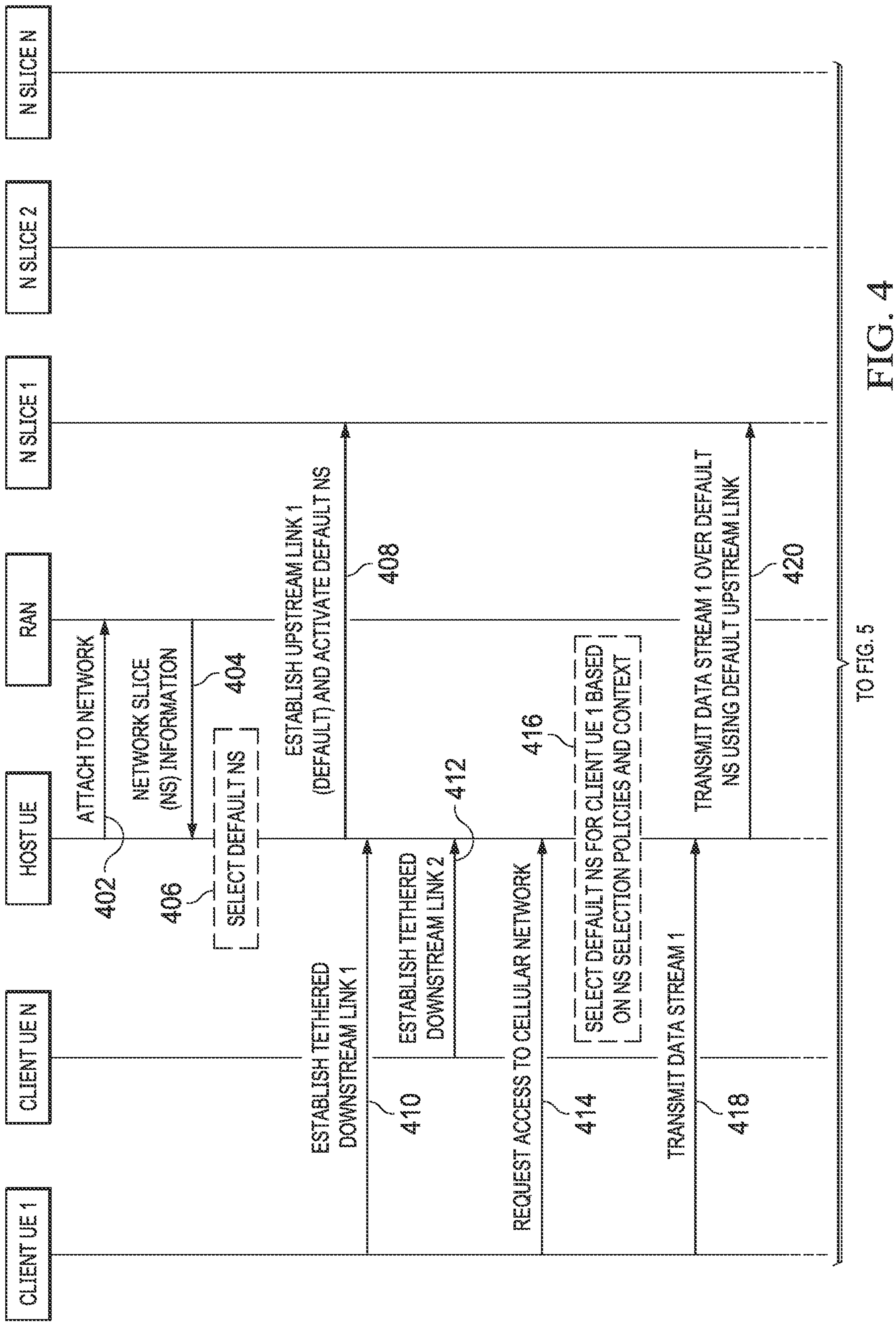
FIGS. 4 and 5 are a diagram illustrating an example operation of implementing network slicing for tethered UE devices in accordance with some embodiments.
Figure 5:
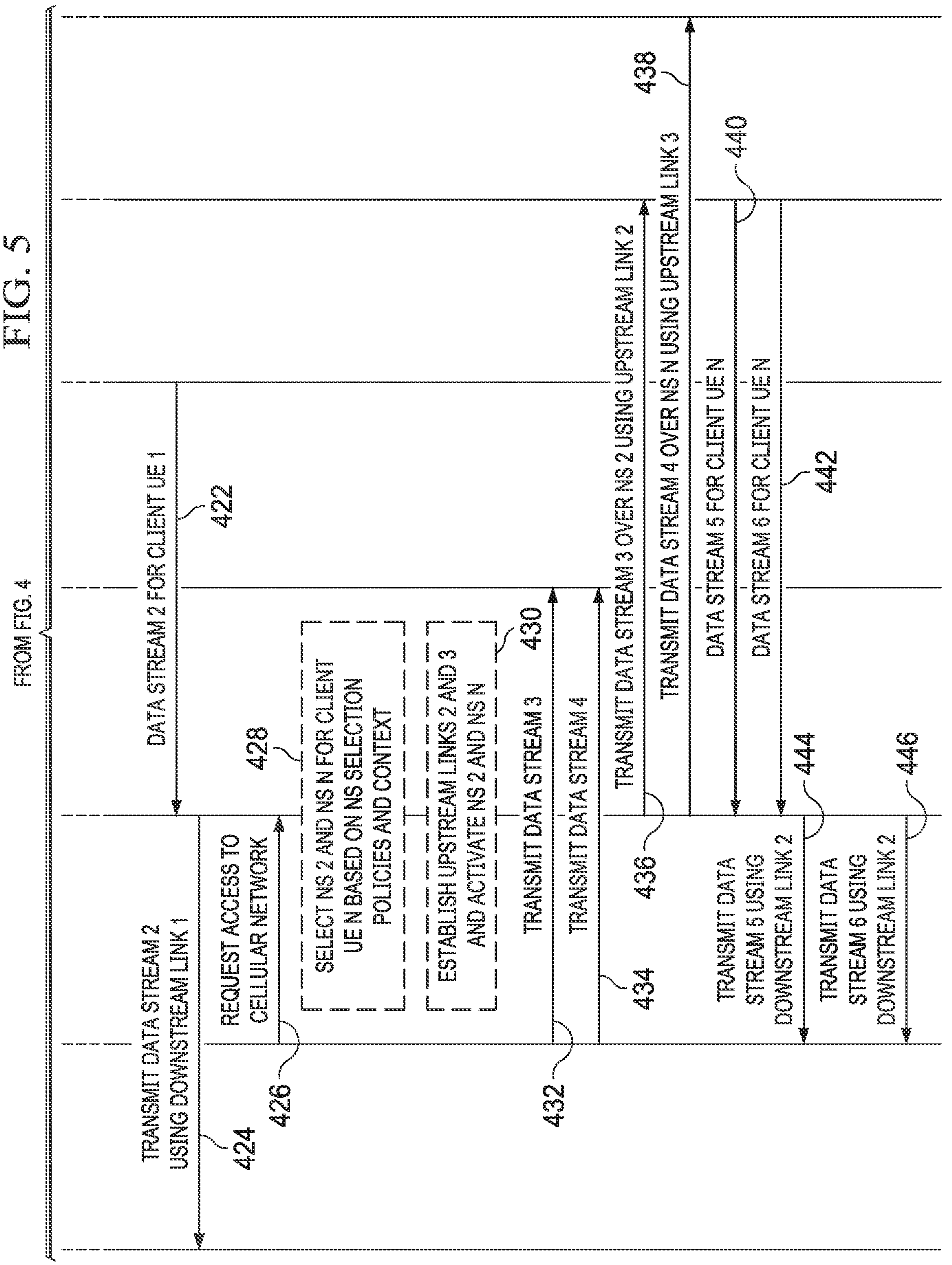

FIG. 4 and FIG. 5 together illustrate an example ladder diagram depicting data and control transactions between devices engaged in tethered connection network slicing in accordance with at least some embodiments. It should be understood the present disclosure is not limited to the illustrated sequence of the transactions shown in FIG. 4 and FIG. 5. One or more of the transactions may be performed in a different order than shown, and/or multiple transactions may be performed in parallel. The host UE device 102 attaches 402 to the cellular network 100 using techniques known in the art. The RAN 106, in at least some embodiments, transmits 404 network slice (NS) information 120 information to the host UE device 102. The network slice information 120 includes, for example, a list of available network slices 118 and a context 132 of each available network slice 118, such as parameters, attributes, capabilities, requirements, and so on of the network slices 118.

The host UE device 102, in at least some embodiments, selects 406 a first (default) network slice 118-1 from the available network slices 118. In other embodiments, the RAN 106 or a core network component 122 selects a default network slice 118-1 for the host UE device 102. The host UE device 102 establishes 408 a default upstream link 116-1 and activates the default network slice 118-1. In some embodiments, the default upstream link 116-1 may be established before selecting the default network slice 118-1. A first client UE device 104-1 establishes 410 a first tethered connection 114-1 with the host UE device 102. At least a second client UE device 104-2 also establishes 412 a second tethered connection 114-3 with the host UE device 102. In at least some embodiments, one or more of the client UE devices 104 may establish a tethered connection 114 with the host UE device 102 before a default network slice 118-1 being selected or activated.

In at least some embodiments, the first client UE device 104-1, requests 414 access to the cellular network 100. The request can be, for example, an explicit request or an implicit request, such as the transmission of a data stream. Responsive to receiving the request, the host UE device 102 selects 416, in this example, the default network slice 118-1 for the first client UE device 104-1 based on network slice selection policies and the context 124 of the first client UE device 104-1 and/or the context 132 of the network slices 118. For example, the context 124 of the first client UE device 104-1 may not have satisfied any of the non-default network slices 118, resulting in the default network slice 118-1 being selected. The first client UE device 104-1 transmits 418 a first data stream to the host UE device 102 using the first tethered connection 114-1. The host UE device 102 receives the first data stream and transmits 420 the first data stream over the default network slice 118-1 using the default upstream link 116-1. A second data stream is received 422 by the host UE device 102 over the default network slice 118-1. The host UE device 102 determines the second data stream is for the first client UE device 104-1 and transmits 424 the second data stream to the first client UE device 104-1 using the first tethered connection 114-1.

In at least some embodiments, the second client UE device 104-2 requests 426 access to the cellular network 100. The request can be, for example, an explicit request or an implicit request, such as the transmission of a data stream. Responsive to receiving the request, the host UE device 102 selects 428 one or more network slices for the second client UE device 104-2, in this example, a second network slice 118-2 and a third network slice 118-3 for the second client UE device 104-2. For example, the context 124 of the second client UE device 104-2 may indicate that two applications (or services), such as music streaming and gaming, are executing on the second client UE device 104-2. Therefore, the host UE device 102 selects the second network slice 118-2 to wirelessly communicate data associated with the first application and select the third network slice 118-3 for wirelessly communicating data associated with the second application. In some embodiments, a network slice 118 is selected for each application.

The host UE device 102 establishes 430 a second upstream link 116-2 and a third upstream link 116-3, and activates the second network slice 118-2 and the third network slice 118-3. The second upstream link 116-2 is associated with the second network slice 118-2, and the third upstream link 116-3 is associated with the third network slice 118-3. In this example, the first upstream link 116-1, the second upstream link 116-2, and the third upstream 116-4 are concurrently active or maintained. The second client UE device 104-2 transmits 432 a third data stream to the host UE device 102 using a second tethered connection 114-2. The second client UE device 104-2 also transmits 434 a fourth data stream to the host UE device 102 using the second tethered connection 114-2.

The host UE device 102 receives the third data stream and transmits 336 the third data stream over the second network slice 118-2 using the second upstream link 116-2. The host UE device 102 receives the fourth data stream and transmits 438 the fourth data stream over the third network slice 118-3 using the third upstream link 116-3. In at least some embodiments, the host UE device 102 determines which upstream link 116 and network slice 118 is associated with a data stream received from a client UE device 104 based on, for example, a context of the data stream. A context of a data stream includes, for example, the type of data being transmitted, the application/service associated with the data, source IP address, destination IP address, and so on. The host UE device 102 receives 440 a fifth data stream over the second network slice 118-2. The host UE device 102 also receives 442 a sixth data stream over the third network slice 118-3. The host UE device 102 determines the fifth data stream is for the second client UE device 104-2 and transmits 444 the fifth data stream to the second client UE device 104-2 using the second tethered connection 114-2. The host UE device 102 also determines the sixth data stream is for the second client UE device 104-2 and transmits 446 the sixth data stream to the second client UE device 104-2 using the second tethered connection 114-2.

Figure 6:
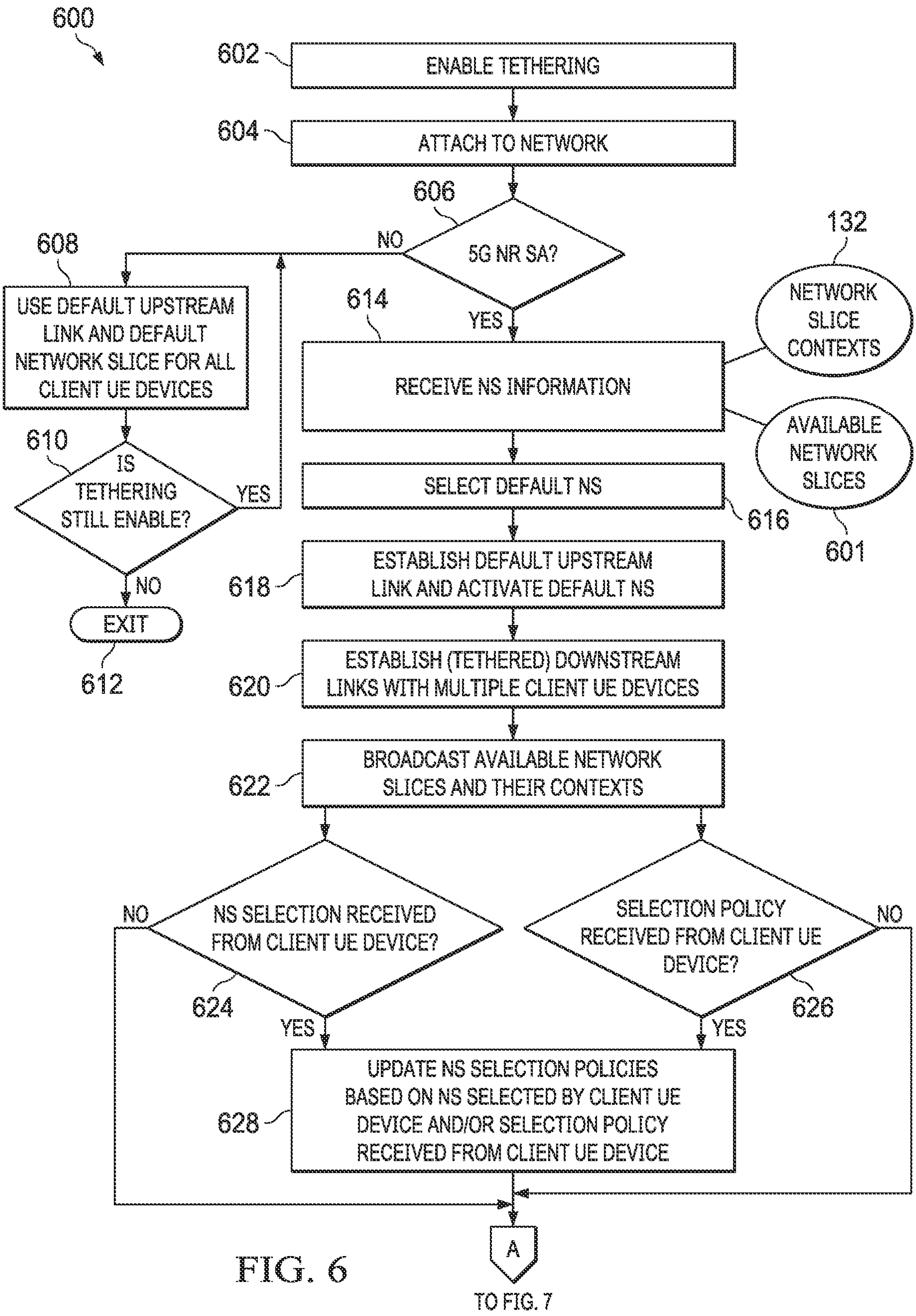
FIG. 6 and FIG. 7 are a flow diagram illustrating an example method for implementing network slicing for tethered UE devices in accordance with some embodiments.
Figure 7:
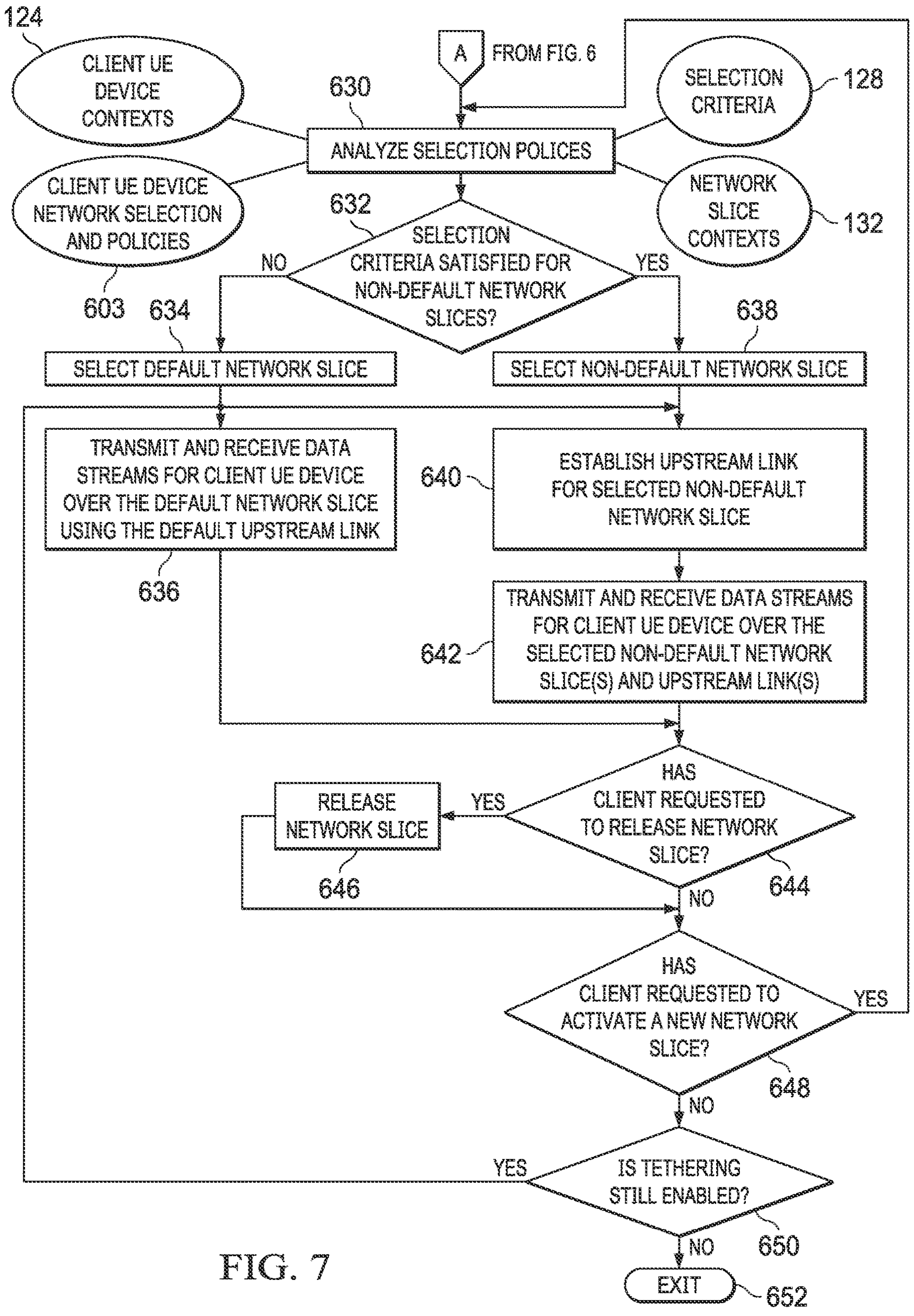

FIG. 6 and FIG. 7 together illustrate, in flow chart form, one example method 600 of a host UE device 102 implementing network slicing for tethered client UE devices 104. The techniques described in the example method 600 have been previously discussed in detail with respect to FIG. 1 to FIG. 6. It should be understood the present disclosure is not limited to the illustrated sequence of the operations shown in FIG. 6 and FIG. 7. One or more of the operations may be performed in a different order than shown, and multiple operations may be performed in parallel.

The method 600 is initiated in response to the host UE device 102 determining that a tethering mode should be enabled. In response to this determination, the host UE device 102 enables the tethering mode at block 602. The host UE device 102, at block 604, attaches to the cellular network 100. The host UE device 102, at block 606, determines if the cellular network 100 is a 5G NR Standalone (SA) network. If the result of this determination is negative (e.g., the cellular network 100 is an LTE network or a 5G NR Non-Standalone (NSA) network), the host UE device 102, at block 608, uses a default upstream link 116-1 and default network slice 118-1 for all tethered client UE devices 104. The host UE device 102 continues with this configuration until a determination is made at block 610 that tethering is no longer enabled. When a determination is made that tethering is no longer enabled, the process then ends at block 612.

If the host UE device 102 determines that the cellular network 100 is a 5G NR SA network, the host UE device 102 obtains network slicing information 120 at block 614. The network slice information 120, in at least some embodiments, comprises a list 601 of available network slices 118 and context information 132 for each available network slice 118. The host UE device 102, at block 616, selects a default network slice 118-1 based on the network slicing information 120. The host UE device 102, at block 618, establishes a default upstream link 116-1 and activates the default network slice 118-1. The host UE device 102, at block 620, establishes a tethered (downstream) link 114 with one or more client UE devices 104. Responsive to one or more tethered connections 114 having been established, the host UE device 102, at block 622, broadcasts the list 601 available network slices 118 and the context information 132 (e.g., capabilities) of each network slice 118.

The host UE device 102, at block 624, determines if a network slice selection was received from the client UE device 104. If a network slice selection was not received from the client UE device 104, the flow continues to block 630 of FIG. 7. However, if a network slice selection was received, the host UE device 102, at block 628, updates one or more network slice selection policies 126 to indicate that the host UE device 102 has requested one or more specific network slices 118 or types of network slices. The flow then continues to block 630 of FIG. 7. The host UE device 102, at block 626, also determines if a network slice selection policy 126 was received from the client UE device 104. If a network slice selection policy 126 was not received from the client UE device 104, the flow continues to block 630 of FIG. 7. However, if a network slice selection policy 126 was received, the host UE device 102, at block 628, updates/customizes one or more network slice selection policies 126 based on the network slice selection policy 126 received from the client UE device 104. The flow then continues to block 630 of FIG. 7.

The host UE device 102, at block 630, analyzes one or more network slice selection policies 126 to select a network slice 118 for one or more client UE devices 104. The selection policies 126-1 can include global selection policies and/or UE specific selection policies 126-2. If the client UE device 104 provided selection data 603, such as a network slice selection and/or a custom selection policy, the host UE device 102 analyzes this selection data 603 when selecting a network slice 118. In at least some embodiments, the host UE device 102 analyzes selection criteria 130 of the selection policies 126 in view of a context 124 of the client UE device 104 and/or a context 132 of the network slices 118.

The host UE device 102, at block 632, determines if the selection criteria 130 of any selection policies associated with the non-default network slices 118-2 to 118-4 have been satisfied. If the result of this determination is negative, the host UE device 102, at block 634, selects the default network slice 118-1. The host UE device 102, at block 636, proceeds to transmit and receive data for the client UE device 104 over the default network slice 118-1 using the default upstream link 116-1. If the selection criteria 130 was satisfied for one or more selection policies 126, the host UE device 102, at block 638, selects one or more non-default network slices 118-2 to 118-4 for the client UE device 104. The host UE device 102, at block 640, establishes an upstream link 116-2 to 116-4 for each of the selected non-default network slices 118-2 to 118-4. The host UE device 102, at block 642, proceeds to transmit and receive data for the client UE device 104 over the one or more selected non-default network slices 118-2 to 118-4 using the associated upstream link(s) 116-2 to 116-4.

The host UE device 102, at block 644, determines if the client UE device 104 has requested to release a network slice 118. If the client UE device 104 has requested to release a network slice 118, the host UE device 102, at block 646, releases the network slice 118, and the flow proceeds to block 648. If the client UE device 104 has not requested to release a network slice 118, the host UE device 102, at block 648, determines if the client UE device 104 has requested to activate a new network slice 118. If the client UE device 104 has requested to activate a new network slice 118, the flow returns to block 630, and the host UE device 102 determines if the requested network slice 118 can be selected for the client UE device 104. If the client UE device 104 has not requested a new network slice 118, the host UE device 102, at block 650, determines if tethering is still enabled. If tethering is still enabled, the flow returns to block 636 or block 640, and the host UE device 102 continues to transmit and receive data for the client UE device 104 over the selected network slice(s) 118 using the associated upstream link(s) 116. If tethering is no longer enabled, the process ends at block 652.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium can be in source code, assembly language code, object code, or another instruction format that is interpreted or otherwise executable by one or more processors.

A computer-readable storage medium includes any storage medium or combination of storage media accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any features that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, by a host user equipment (UE), comprising:

establishing a first tethered connection between the host UE and at least one client UE;

identifying a plurality of network slices provided by a network;

receiving, from the at least one client UE over the first tethered connection, a request to access the network;

responsive to receiving the request, selecting at least a first network slice from the plurality of network slices for use by the at least one client UE to communicate with the network via the host UE; and wirelessly communicating data for the at least one client UE over the at least first network slice using a first upstream link.

2. The method of claim 1, further comprising:

selecting a second network slice from the plurality of network slices for use by the host UE; and wirelessly communicating data for the host UE over the second network slice using a second upstream link.

3. The method of claim 2, further comprising:

maintaining the first upstream link concurrently with the second upstream link.

4. The method of claim 1, wherein selecting the at least first network slice comprises:

obtaining a context associated with at least one of the at least one client UE or the at least first network slice;

comparing the context to selection criteria of one or more network slice selection policies; and selecting the at least first network slice responsive to comparing the context to the selection criteria of the one or more network slice selection policies.

5. The method of claim 4, wherein at least one of the one or more network slice selection policies is received from the at least one client UE.

6. The method of claim 4, wherein selecting the at least first network slice further comprises:

determining the context satisfies selection criteria of at least one network slice selection policy of the one or more network slice selection policies; and selecting the at least first network slice responsive to the context satisfying the selection criteria of the at least one network slice selection policy, wherein the at least first network slice is separate and distinct from a second network slice used by the host UE.

7. The method of any of claim 4, further comprising:

wirelessly communicating data for the at least one client UE over the at least first network slice using a first upstream link, and wherein selecting the at least first network slice further comprises:

determining the context fails to satisfy the selection criteria of any of the one or more network slice selection policies; and selecting the at least first network slice responsive to the context satisfying any of the one or more network slice selection policies, wherein the at least first network slice is a default network slice used by the host UE, and wherein the first upstream link is a default upstream link used by the host UE for wirelessly communicating data over the default network slice.

8. The method of claim 1, further comprising:

wirelessly communicating data for the at least one client UE over the at least first network slice using a first upstream link;

establishing a second tethered connection with a third UE;

selecting at least a second network slice from the plurality of network slices for use by the third UE; and wirelessly communicating data for the third UE over the at least second network slice using a second upstream link, wherein the at least second network slice is separate and distinct from the at least first network slice, and wherein the first upstream link is maintained concurrently with the second upstream link.

9. The method of claim 1, further comprising:

wirelessly communicating data for the at least one client UE over the at least first network slice using a first upstream link;

selecting a second network slice from the plurality of network slices for use by the at least one client UE; and wirelessly communicating data for the at least one client UE over the second network slice using a second upstream link, wherein the second network slice is separate and distinct from the at least first network slice, and wherein the first upstream link is maintained concurrently with the second upstream link.

10. The method of claim 1, wherein selecting the at least first network slice comprises:

transmitting information associated with the plurality of network slices;

receiving a selection of the at least first network slice from the at least one client UE responsive to transmitting the information; and selecting the at least first network slice responsive to receiving the selection from the at least one client UE.

11. The method of claim 1, further comprising:

receiving a request from the at least one client UE to release the at least first network slice; and releasing the at least first network slice responsive to receiving the request.

12. The method of claim 1, further comprising:

determining a context of the first tethered connection; and allocating one or more resources for the first tethered connection based on one or more policies and the context of the first tethered connection.

13. The method of claim 1, wherein identifying the plurality of network slices provided by the network comprises receiving, from a core network of a cellular network, information identifying the plurality of network slices.

14. A non-transitory computer readable medium embodying a set of executable instructions, the set of executable instructions to manipulate one or both of a processor and one or more radio frequency modems of a user equipment to perform the method of claim 1.

15. A host user equipment, comprising:

one or more radio frequency (RF) modems configured to wirelessly communicate with at least one network;

a processor coupled to the one or more RF modems; and at least one memory storing executable instructions, the executable instructions configured to manipulate one or both of the processor and the one or more RF modems to:

establish a first tethered connection between the host user equipment (UE) and at least one client UE;

identify a plurality of network slices provided by the network;

receive, from the at least one client UE over the first tethered connection, a request to access the network;

responsive to receiving the request, select at least a first network slice from the plurality of network slices for use by the at least one client UE; and wirelessly communicate data for the at least one client UE over the at least first network slice using a first upstream link.

16. The host user equipment of claim 15, wherein one or both of the processor and the one or more RF modems are further manipulated to:

select a second network slice from the plurality of network slices for use by the host UE; and wirelessly communicate data for the host UE over the second network slice using a second upstream link.

17. The host user equipment of claim 16, wherein one or both of the processor and the one or more RF modems are further manipulated to:

maintain the first upstream link concurrently with the second upstream link.

18. The host user equipment of claim 15, wherein one or both of the processor and the one or more RF modems are manipulated to select the at least first network slice by:

obtaining a context associated with at least one of the at least one client UE or the at least first network slice;

comparing the context to selection criteria of one or more network slice selection policies; and selecting the at least first network slice responsive to comparing the context to the selection criteria of the one or more network slice selection policies.

19. The host user equipment of claim 18, wherein one or both of the processor and the one or more RF modems are manipulated to select the at least first network slice by:

determining the context satisfies selection criteria of at least one network slice selection policy of the one or more network slice selection policies; and selecting the at least first network slice responsive to the context satisfying the selection criteria of the at least one network slice selection policy, wherein the at least first network slice is separate and distinct from a second network slice used by the host UE.

20. The host user equipment of claim 15, wherein one or both of the processor and the one or more RF modems are manipulated to identify the plurality of network slices provided by the network by receiving, from a core network of a cellular network, information identifying the plurality of network slices.

* * * * *